US012688603B2

(12) United States Patent
Zou et al.

(10) Patent No.: US 12,688,603 B2
(45) Date of Patent: Jul. 21, 2026

(54) METHOD TO DETECT CAMERA POSITION CHANGE ON MOVING VEHICLE PARTS

(71) Applicant: GM Global Technology Operations LLC, Detroit, MI (US)

(72) Inventors: Guangyu Zou, Warren, MI (US);
Ismail Hamieh, Dearborn, MI (US);
Mohsen Khalili, Sterling Heights, MI (US); Xiaoyang Liu, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 327 days.

(21) Appl. No.: 18/499,466

(22) Filed: Nov. 1, 2023

(65) Prior Publication Data

US 2025/0139807 A1    May 1, 2025

(51) Int. Cl.

| | |
|---|---|
| *G06T 7/70* | (2017.01) |
| *B60W 50/14* | (2020.01) |
| *G06T 7/20* | (2017.01) |
| *G06T 7/80* | (2017.01) |
| *G06V 10/44* | (2022.01) |
| *G06V 10/46* | (2022.01) |
| *G06V 20/56* | (2022.01) |

(52) U.S. Cl.
CPC .............. *G06T 7/70* (2017.01); *B60W 50/14* (2013.01); *G06T 7/20* (2013.01); *G06T 7/80* (2017.01); *G06V 10/44* (2022.01); *G06V 10/462* (2022.01); *G06V 20/56* (2022.01); *G06T 2207/30244* (2013.01); *G06T 2207/30252* (2013.01)

(58) Field of Classification Search
CPC . B60W 50/14; G06T 7/20; G06T 7/70; G06T 7/80; G06T 2207/30244; G06T 2207/30252; G06V 10/44; G06V 10/462; G06V 20/56
See application file for complete search history.

(56) References Cited

U.S. PATENT DOCUMENTS

| | | | |
|---|---|---|---|
| 10,916,035 B1 * | 2/2021 | Kroeger | G05D 1/0212 |
| 2015/0332098 A1 * | 11/2015 | Wang | G06T 7/73 |
| | | | 382/103 |

(Continued)

*Primary Examiner* — John Villecco
*Assistant Examiner* — Joshua B. Crockett
(74) *Attorney, Agent, or Firm* — Vivacqua Crane, PLLC

(57) ABSTRACT

A system for detecting sensor position change (DCPC) on movable vehicle components includes two or more sensors on at least one of the movable vehicle components. The sensors detect optical information within a distinct field of view (FOV) about an environment surrounding the vehicle. The distinct FOV of each sensor at least partially overlaps with an FOV of at least one other sensor. The system includes controllers that execute an application for DCPC. The DCPC application acquires overlapping optical information from the sensors, computes a conditional correspondence probability distribution for feature points in the overlapping optical information, computes a normalized joint entropy of the feature points, determines that the sensor is in a position manageable by the DCPC, continuously monitors positions of each of the sensors, selectively dynamically aligns the sensors, and ensures that the sensors are calibrated for vehicle perception tasks including advanced driver assistance system (ADAS) functions.

18 Claims, 5 Drawing Sheets

(56)        References Cited

U.S. PATENT DOCUMENTS

| | | | |
|---|---|---|---|
| 2016/0278153 A1* | 9/2016 | Kim | H04W 4/023 |
| 2016/0284087 A1* | 9/2016 | Natroshvili | G06T 7/80 |
| 2017/0171542 A1* | 6/2017 | Sommerlade | G06T 7/80 |
| 2021/0304424 A1* | 9/2021 | Zaid | H04N 23/951 |
| 2025/0050894 A1* | 2/2025 | Bangalore Ravi | G06V 20/56 |

* cited by examiner

METHOD TO DETECT CAMERA POSITION CHANGE ON MOVING VEHICLE PARTS

INTRODUCTION

The present disclosure relates to cameras disposed on vehicles, and more specifically to cameras disposed on movable vehicle components.

In modern vehicles, timely awareness of moving vehicle component displacement, such as movable mirrors or lift-gates, is important, as sensors are often attached to the movable vehicle components. Such sensors are increasingly used in advanced driver assistance system (ADAS) actions, and in automated driving processes, generally. In an event such as an impact on a sensor housing or sensor housing bracket, the view of the attached sensor can change significantly. If such displacement is not timely and accurately addressed, the sensor will provide inaccurate information to the sensing and perception system of the vehicle. Similarly, some sensors are mounted to vehicle components which are automated in movement, such as auto-folding mirrors and the like. Accordingly, if the automated movement process fails partially or entirely, the sensors may similarly provide inaccurate information to the sensing and perception systems of the vehicle.

While current systems and methods for detecting positions of cameras achieve their intended purpose, there is a need for a new and improved system and method for detecting the position changes for cameras or sensors disposed on moving vehicle parts that can be applied to detect changes in positions of cameras mounted on a variety of movable vehicle parts in a variety of different vehicle applications, and which may be retrofitted to existing vehicles or equipped to new vehicles. Further, there is a need for systems and methods for detecting position changes of cameras or sensors disposed on moving vehicle parts that can be run continuously without substantially increasing computational burdens, and without increasing system or component complexity, that improve system functionality and resiliency, that improve robustness, increase redundancy, and improve customer satisfaction.

SUMMARY

According to several aspects of the present disclosure, a system for detecting sensor position change on movable vehicle components includes a vehicle having one or more movable vehicle components. The system further includes two or more sensors disposed on at least one of the one or more movable vehicle components. Each of the two or more sensors detects optical information within a distinct field of view (FOV) about an environment surrounding the vehicle. The distinct FOV of each of the two or more sensors at least partially overlaps with an FOV of at least one other sensor. The system further includes one or more controllers. Each of the one or more controllers has a processor, a memory, and one or more input/output (I/O) ports. The I/O ports are in communication with the two or more sensors. The memory stores programmatic control logic. The processor executes the programmatic control logic, including an application for detecting sensor position change (DCPC). The DCPC includes at least a first, a second, a third, a fourth, and a fifth control logic. The first control logic acquires overlapping optical information from the two or more sensors. The second control logic computes a conditional correspondence probability distribution for feature points in the overlapping optical information. The third control logic computes a normalized joint entropy of the feature points in the overlapping optical information. The fourth control logic determines that the sensor is in a position manageable by the DCPC. The fifth control logic continuously monitors positions of each of the two or more sensors, selectively dynamically aligning the sensors, and ensuring that the two or more sensors are calibrated properly for vehicle perception tasks including advanced driver assistance system (ADAS) functions.

In another aspect of the present disclosure the first control logic also includes control logic that acquires optical information from at least one wide-angle satellite (YSAT) camera having a field of view of approximately 180°, and acquires optical information at least partially overlapping the YSAT field of view from at least one perception satellite (PSAT) camera having a field of view of approximately 20° to about 100°. The movable vehicle components include one or more of: one or more exterior vehicle mirrors, one or more doors, a trunk and a tailgate.

In yet another aspect of the present disclosure the first control logic further includes control logic that performs visual feature extraction utilizing one or more of handcrafted and learning-based methods including one or more of: Self-sUPERvised interest POINT detection and description (SUPERPOINT), Learned Invariant Feature Transform (LIFT), Scale Invariant Feature Transform (SIFT), and Oriented Fast and Rotated Brief (ORB).

In still another aspect of the present disclosure the second control logic further includes control logic for computing conditional correspondence distribution for overlapping feature points by:

$$p(x'_j \mid x_i) \propto \exp\left(-\frac{d_{ij} - d_N(x_i)}{\lambda d_N(x_i)}\right), \text{ subject to:} \qquad \text{I.}$$

$$\sum_{j=1}^{n'} p(x'_j \mid x_i) = 1; \qquad \text{II.}$$

where $$x'_j \text{ and } x_i$$

are feature points from images acquired from separate sensors, respectively:

$$d_{ij} = dist\big(des(x_i), des(x'_j)\big); \qquad \text{III.}$$

is a predefined distance metric monotonically increasing relative to a Euclidean distance between descriptors of the points $$x'_j \text{ and } x_i,$$

$$d_N(x_i) = \min_j(d_{ij}); \qquad \text{IV.}$$

and is a nearest neighbor of point $x_i$ in feature space, given the predefined metric, and $\lambda$ is a tunable inverse scale parameter of an exponential probability distribution.

In yet another aspect of the present disclosure the third control logic further includes control logic for computing a normalized joint entropy from the conditional correspondence distribution for each of the overlapping feature points $$x'_j, x_i,$$

etc., according to:

$$H(C, C') = \frac{1}{\eta}\sum_{i=1}^{n}\sum_{j=1}^{n'} p(x_i)p(x'_j \mid x_i)\log(p(x_i)p(x'_j \mid x_i)); \quad \text{V.}$$

where $\eta=\log(nn')$ is the maximum joint entropy, and $p(x_i)$ is a uniform distribution when prior information is unavailable.

In still another aspect of the present disclosure the DCPC further includes control logic for applying temporal smoothing to outputs of the second and third control logics. The temporal smoothing accounts for unexpected vehicle movements.

In yet another aspect of the present disclosure the fourth control logic further includes control logic for executing a threshold check. The threshold check compares a position of FOVs of the two or more sensors against a library of calibration values.

In still another aspect of the present disclosure the fourth control logic includes control logic that: upon determining that a position of a sensor is displaced from an expected position by an amount greater than or equal to a threshold value, causes the DCPC to generate a notification to a vehicle operator; and upon determining that the position of the sensor is displaced from the expected position by an amount less than the threshold value, causes the DCPC to dynamically align the sensor.

In yet another aspect of the present disclosure upon determining that the position of a sensor is displaced from an expected position by an amount greater than or equal to the threshold value, the DCPC generates outputs including: setting a code in memory of the vehicle, sending a code via wired or wireless communication to a service center, and disabling ADAS functions involving the sensor that is out of position by an amount greater than or equal to the threshold value.

In still another aspect of the present disclosure the fifth control logic further includes selectively dynamically aligning the sensors by applying the conditional correspondence probability distribution for each feature point $$x'_j \text{ and } x_i,$$

determining a Euclidean distance $d_{ij}$ between the corresponding feature points $$x'_i \text{ and } x_i,$$

and generating a calibration for the sensors that accounts for positional discrepancies between corresponding feature points

4

$$x'_i \text{ and } x_i$$

in the FOVs of each of the sensors.

According to several additional aspects of the present disclosure a method for detecting sensor position change on movable vehicle components includes: detecting optical information with two or more sensors disposed on one or more movable vehicle components of a vehicle. Each of the two or more sensors has a distinct field of view (FOV) of an environment surrounding the vehicle. The distinct FOV of each of the two or more sensors at least partially overlaps with an FOV of at least one other sensor. The method further includes executing, by one or more controllers, programmatic control logic including an application for detecting sensor position change (DCPC). Each of the one or more controllers has a processor, a memory, and one or more input/output (I/O) ports. The I/O ports are in communication with the two or more sensor. The memory stores the programmatic control logic, and the processor executes the programmatic control logic, including the DCPC. The DCPC includes control logic for: acquiring overlapping optical information from the two or more sensors; computing a conditional correspondence probability distribution for feature points in the overlapping optical information; computing a normalized joint entropy of the feature points in the overlapping optical information; determining that the sensor is in a position manageable by the DCPC; and continuously monitoring positions of each of the two or more sensors, selectively dynamically aligning the sensors, and ensuring that the two or more sensors are calibrated properly for vehicle perception tasks including advanced driver assistance system (ADAS) functions.

In yet another aspect of the present disclosure the method further includes acquiring optical information from at least one wide-angle satellite (YSAT) camera having a field of view of approximately 180°, and acquiring optical information at least partially overlapping the YSAT field of view from at least one perception satellite (PSAT) camera having a field of view of approximately 20° to about 100°.

In still another aspect of the present disclosure the method further includes performing visual feature extraction utilizing one or more of handcrafted and learning-based methods including one or more of: Self-sUPERvised interest POINT detection and description (SUPERPOINT), Learned Invariant Feature Transform (LIFT), Scale Invariant Feature Transform (SIFT), and Oriented Fast and Rotated Brief (ORB).

In yet another aspect of the present disclosure the method further includes computing conditional correspondence distribution for overlapping feature points by:

$$p(x'_j \mid x_i) \propto \exp\left(-\frac{d_{ij} - d_N(x_i)}{\lambda d_N(x_i)}\right), \text{ subject to:} \quad \text{I.}$$

$$\sum_{j=1}^{n'} p(x'_j \mid x_i) = 1; \quad \text{II.}$$

where $$x'_j \text{ and } x_i$$

are feature points from images acquired from separate sensors, respectively:

$$d_{ij} = dist\big(des(x_i), des(x'_j)\big); \qquad \text{III.}$$

is a predefined distance metric monotonically increasing relative to a Euclidean distance between descriptors of the points $$x'_j \text{ and } x_i,$$

$$d_N(x_i) = \min_j(d_{ij}); \qquad \text{IV.}$$

and is a nearest neighbor of point $x_i$ in feature space, given a predefined metric, and $\lambda$ is a tunable inverse scale parameter of an exponential probability distribution.

In still another aspect of the present disclosure the method further includes computing a normalized joint entropy from the conditional correspondence distribution for each of the overlapping feature points $$x'_j, x_i,$$

etc., according to:

$$H(C, C') = \frac{1}{\eta}\sum_{i=1}^{n}\sum_{j=1}^{n'} p(x_i)p(x'_j \mid x_i)\log(p(x_i)p(x'_j \mid x_i)); \qquad \text{V.}$$

where $\eta=\log(nn')$ is the maximum joint entropy, and $p(x_i)$ is a uniform distribution when prior information is unavailable; and selectively dynamically aligning the sensors by applying the conditional correspondence probability distribution for each feature point $$x'_j \text{ and } x_i,$$

determining the distance $d_{ij}$ between the corresponding feature points $$x'_i \text{ and } x_i,$$

and initiating a calibration for the sensors that accounts for positional discrepancies between corresponding feature points $$x'_i \text{ and } x_i$$

in the FOVs of each of the sensors.

In yet another aspect of the present disclosure the method further includes applying temporal smoothing to outputs of normalized entropy and conditional correspondence distribution computations, where the temporal smoothing accounts for unexpected vehicle movements.

In still another aspect of the present disclosure the method further includes executing a threshold check. The threshold check compares a position of FOVs of the two or more sensors against a library of calibration values.

In yet another aspect of the present disclosure the method further includes upon determining that a position of a sensor is displaced from an expected position by an amount greater than or equal to a threshold value, causing the DCPC to generate a notification to a vehicle operator; and upon determining that the position of the sensor is displaced from the expected position by an amount less than the threshold value, causing the DCPC to dynamically align the sensor.

In still another aspect of the present disclosure the method further includes upon determining that the position of a sensor is displaced from an expected position by an amount greater than or equal to the threshold value, causing the DCPC to generate outputs including: setting a code in memory of the vehicle, sending a code via wired or wireless communication to a service center, and disabling ADAS functions involving the sensor that is out of position by an amount greater than or equal to the threshold value.

In several additional aspects of the present disclosure a method for detecting sensor position change on movable vehicle components includes detecting optical information, with two or more sensors disposed on one or more movable vehicle components of a vehicle. Each of the two or more sensors has a distinct field of view (FOV) of an environment surrounding the vehicle. The distinct FOV of each of the two or more sensors at least partially overlaps with an FOV of at least one other sensor. The method further includes executing, by one or more controllers, programmatic control logic including an application for detecting sensor position change (DCPC). Each of the one or more controllers has a processor, a memory, and one or more input/output (I/O) ports. The I/O ports are in communication with the two or more sensors. The memory stores the programmatic control logic. The processor executes the programmatic control logic, including executing the DCPC. The DCPC includes control logic for acquiring overlapping optical information from the two or more sensors, including: acquiring optical information from at least one wide-angle satellite (YSAT) camera having a field of view of approximately 180°; and acquiring optical information at least partially overlapping the YSAT field of view from at least one perception satellite (PSAT) camera having a field of view of approximately 20° to about 100°. The DCPC further includes control logic for performing visual feature extraction utilizing one or more of handcrafted and learning-based methods including one or more of: Self-sUPERvised interest POINT detection and description (SUPERPOINT), Learned Invariant Feature Transform (LIFT), Scale Invariant Feature Transform (SIFT), and Oriented Fast and Rotated Brief (ORB). The DCPC further includes control logic for computing conditional correspondence distribution for overlapping feature points in the overlapping optical information by:

$$p(x'_j \mid x_i) \propto \exp\left(-\frac{d_{ij} - d_N(x_i)}{\lambda d_N(x_i)}\right), \text{ subject to:} \qquad \text{I.}$$

$$\sum_{j=1}^{n'} p(x'_j \mid x_i) = 1; \qquad \text{II.}$$

where $$x'_j \text{ and } x_i,$$

are feature points from images acquired from separate sensors, respectively:

$$d_{ij} = dist\big(des(x_i), des(x'_j)\big); \qquad \text{III.}$$

is a predefined distance metric monotonically increasing relative to a Euclidean distance between descriptors of the points $$x'_j \text{ and } x_i,$$

$$d_N(x_i) = \min_j(d_{ij}); \qquad \text{IV.}$$

and
is a nearest neighbor of point $x_i$ in feature space, given a predefined metric, and $\lambda$ is a tunable inverse scale parameter of an exponential probability distribution. The DCPC further includes control logic for computing a normalized joint entropy from the conditional correspondence distribution for each of the overlapping feature points $$x'_j, x_i,$$

etc., according to:

$$H(C, C') = \frac{1}{\eta}\sum_{i=1}^n \sum_{j=1}^{n'} p(x_i)p(x'_j \mid x_i)\log(p(x_i)p(x'_j \mid x_i)); \qquad \text{V.}$$

where $\eta = \log(nn')$ is the maximum joint entropy, and $p(x_i)$ is a uniform distribution when prior information is unavailable. The DCPC further includes control logic for selectively dynamically aligning the sensors by applying the conditional correspondence probability distribution for each feature point $$x'_j \text{ and } x_i,$$

determining the distance $d_{ij}$ between the corresponding feature points $$x'_i \text{ and } x_i,$$

and initiating a calibration for the sensors that accounts for positional discrepancies between corresponding feature points $$x'_i \text{ and } x_i$$

in the FOVs of each of the sensors. The DCPC further includes control logic for applying temporal smoothing to outputs of normalized entropy and conditional correspondence distribution computations. The temporal smoothing accounts for unexpected vehicle movements. The DCPC further includes control logic for determining that the sensor is in a position manageable by the DCPC by: executing a threshold check. The threshold check compares a position of FOVs of the two or more sensors against a library of calibration values. Upon determining that the position of the sensor is displaced from the expected position by an amount less than the threshold value, causing the DCPC to dynamically align the sensor by applying the conditional correspondence probability distribution for each feature point $$x'_j \text{ and } x_i,$$

determining a Euclidean distance $d_{ij}$ between the corresponding feature points $$x'_i \text{ and } x_i,$$

and generating a calibration for the sensors that accounts for positional discrepancies between corresponding feature points $$x'_i \text{ and } x_i$$

in the FOVs of each of the sensors. The DCPC further includes control logic for upon determining that a position of a sensor is displaced from an expected position by an amount greater than or equal to a threshold value, causing the DCPC to generate a notification by performing one or more of: setting a code in memory of the vehicle, sending a code via wired or wireless communication to a service center, notifying a vehicle operator via a human-machine interface (HMI), and at least temporarily disabling ADAS functions involving the sensor that is out of position by an amount greater than or equal to the threshold value. The DCPC further includes control logic for continuously monitoring positions of each of the two or more sensors, selectively dynamically aligning the sensors, and ensuring that the two or more sensors are calibrated properly for vehicle perception tasks including advanced driver assistance system (ADAS) functions.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
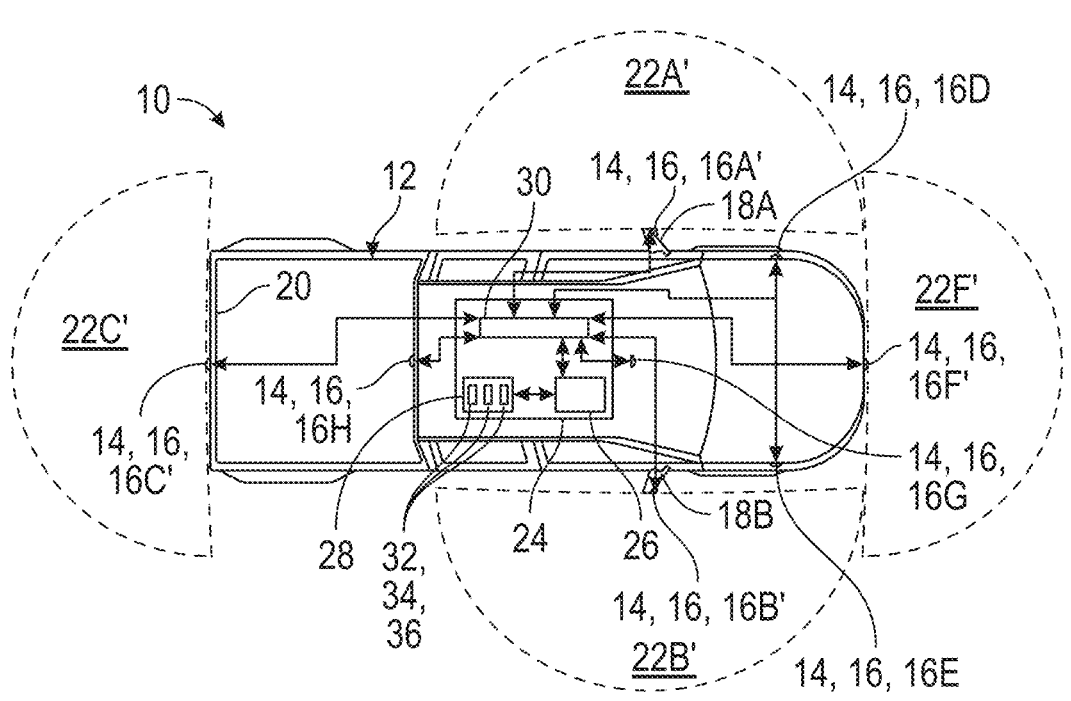
FIG. 1A is a schematic diagram of a vehicle equipped with a system for detecting camera position change (DCPC) on moving vehicle parts, and equipped with wide angle satellite (YSAT) cameras according to an aspect of the present disclosure.
Figure 1B:
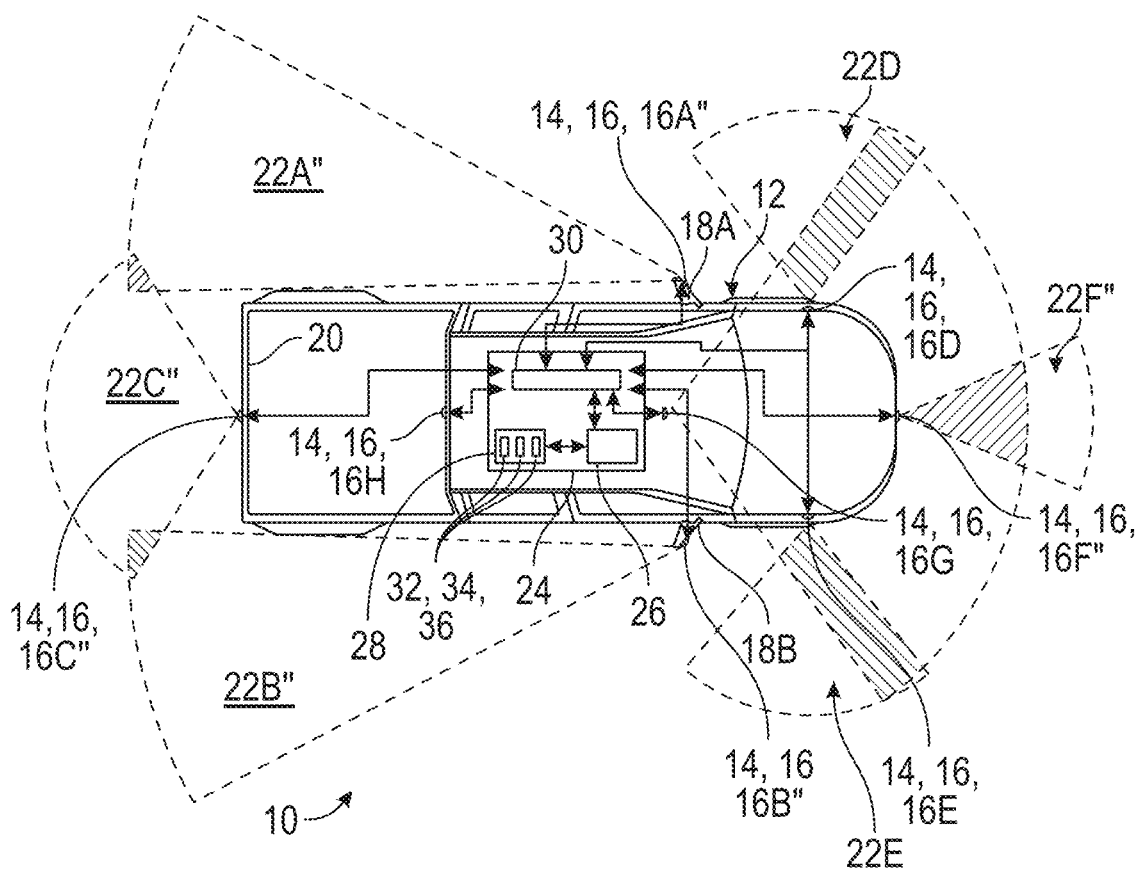
FIG. 1B is a schematic diagram of the vehicle of FIG. 1A equipped with the system for DCPC on moving vehicle parts, and equipped with perception satellite (PSAT) cameras according to another aspect of the present disclosure.

Referring to FIGS. 1A and 1B, a system 10 for detecting camera position changes on movable vehicle parts is shown in schematic form. The system 10 generally includes a vehicle 12. While the vehicle 12 shown is a pickup truck, the vehicle 12 may be any of a wide variety of vehicle 12 types without departing from the scope or intent of the present disclosure. The vehicle 12 may be any of a wide variety of vehicles 12 including but not limited to: cars, trucks, sport-utility vehicles (SUVs), busses, semi-tractors, tractors used in farming or construction or the like, watercraft, aircraft such as airplanes, helicopters, gyrocopters, or the like. At least two sensors 14 are disposed on the vehicle 12. The sensors 14 may be any of a wide variety of sensors 14 that capture data about the environment surrounding the vehicle 12, including electromagnetic and/or optical information in a variety of different wavelengths, including those visible to humans, as well as infrared, ultraviolet, and other such portions of the light spectrum that are not visible by humans. The sensors 14 may further include cameras 16, Light Detection and Ranging (LiDAR) sensors, Radio Detection and Ranging (RADAR) sensors, Sound Navigation and Ranging (SONAR) sensors, ultrasonic sensors, and any of a variety of other sensors 14 capable of determining vehicle 12 position information relative to the environment surrounding the vehicle 12 without departing form the scope or intent of the present disclosure. In several aspects, the sensors 14, including cameras 16, may be integrated directly onto or into the vehicle 12, or may be fitted in an after-sales service performed by the vehicle 12 manufacturer, dealer, customer, or by other third parties without departing from the scope or intent of the present disclosure.

One or more of the sensors 14 of the vehicle 12 are formed with, disposed on, or otherwise mounted to movable components of the vehicle 12. That is, the vehicle 12 shown in FIGS. 1A and 1B is equipped with movable exterior mirrors 18A, 18B, and a movable tailgate 20. A sensor 14, specifically a camera 16, is mounted to or otherwise disposed on each of the movable exterior mirrors 18A, 18B, and the movable tailgate 20. It should be appreciated that the vehicle 12 may have sensors 14 disposed on other movable and/or fixed exterior components without departing from the scope or intent of the present disclosure. In several examples, movable exterior components of the vehicle 12 to which sensors 14 may be attached may include: exterior mirrors 18A, 18B that may be manual-folding or power folding, a manual or power folding tailgate 20, trunk lid (not specifically shown), hatchback, rolling door, movable aerodynamic device (i.e. a spoiler, an active front air dam, or the like), one or more movable panels such as doors, or the like. Immovable mounting locations for sensors 14 may include front and/or rear fenders, bumpers, and the like without departing from the scope or intent of the present disclosure.

Referring now specifically to the cameras 16 shown in FIGS. 1A and 1B, each of the cameras 16 has its own field of view (FOV) 22. The cameras 16 shown in FIG. 1A are depicted as having wide-angle perception capabilities. That is, the cameras 16 equipped to the vehicle 12 of FIG. 1A are wide-angle satellite (YSAT) cameras that have an FOV 22 of approximately 180°, or in some examples, an FOV 22 greater than 180°. By contrast, the cameras 16 equipped to the vehicle 12 of FIG. 1B are perception satellite (PSAT) cameras 16 having FOVs 22 that are between about 20° and about 100°, though the precise measures of the PSAT cameras' 16 FOVs 22 may vary substantially without departing from the scope or intent of the present disclosure. Further, it should be appreciated that the vehicles 12 displayed in FIGS. 1A and 1B are, in fact, the same vehicle 12, and that FIGS. 1A and 1B only depict different sets of cameras 16 equipped to the vehicle 12 for the sake of clarity.

Specifically, a left mirror PSAT camera 16A' mounted to the left-hand movable exterior mirror 18A has a left rear FOV 22A" where similarly or identically situated left mirror YSAT camera 16A' has left FOV 22A' which substantially overlaps left rear FOV 22A". Likewise, a right mirror PSAT camera 16B' mounted to the right-hand movable exterior mirror 18B has a right rear FOV 22B", where similarly or identically situated right mirror YSAT camera 16B' has left FOV 22B' which substantially overlaps right rear FOV 22B". Similarly, a tailgate 20 mounted camera 16C" has a rearward FOV 22C". The tailgate 20 may also have a rearward YSAT camera 16C' mounted thereon and providing a rear YSAT FOV 22C' The left rear FOV 22A" overlaps at least partially with the rearward FOV 22C", and the right rear FOV 22B" also overlaps at least partially with the rearward FOV 22C". The left-mirror camera 16A or a left fender-mounted camera 16D, may also have a left front FOV 22D, and the right mirror camera 16B or a right fender-mounted camera 16E may also have a right front FOV 22E. Each of the left front FOV 22D and right front FOV 22E may overlap at least partially with a forward FOV 22F" of a front-mounted camera 16F". Likewise, a front-mounted YSAT camera 16F' may be equipped to the vehicle 12, and has forward YSAT FOV 22F' which overlaps partially or completely with at least the forward FOV 22F", left front FOV 22D, and right front FOV 22E. It should be appreciated that while left-mirror, right-mirror, rear and front-mounted cameras 16A, 16B, 16C, 16D are specifically described herein with respect to FIG. 1A, and left and right fender-mounted cameras 16E and 16F are described with respect to FIG. 1B, additional cameras 16 with additional FOVs 22 may be disposed on the vehicle 12 and provide additional optical information to the vehicle 12. In some examples, the additional cameras 16 may include a windshield or interior rear-view mirror mounted camera 16G, a truck bed camera or other such high-mount rear view camera 16H, or the like. In many respects, because the YSAT cameras depicted in FIG. 1A have larger FOVs 22 than the PSAT cameras depicted in FIG. 1B, it should be appreciated that the vehicle 12 of FIGS. 1A and 1B is provided with data from the YSAT cameras 16 that substantially overlaps the data provided by the PSAT cameras 16.

The vehicle 12 is further equipped with one or more controllers 24. The controllers 24 are non-generalized, electronic control devices having a preprogrammed digital computer or processor 26, non-transitory computer readable medium or memory 28 used to store data such as control logic, software applications, instructions, computer code, data, lookup tables, etc., and a transceiver or input/output (I/O) ports 30. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable memory 28 excludes wired, wireless, optical, or other communication links that transport transitory electrical or other signals. A non-transitory computer readable memory 28 includes media where data can be permanently stored and media where data can be stored and later overwritten, such as a rewritable optical disc or an erasable memory device. Computer code includes any type of program code, including source code, object code, and executable code. The processor 26 is configured to execute the code or instructions. In vehicles 12, the controller 24 may be a dedicated Wi-Fi controller or an engine control module, a transmission control module, a body control module, an infotainment control module, etc. The I/O ports 30 are configured to wirelessly communicate using Wi-Fi protocols under IEEE 802.11x, cellular protocols such as global system for mobile communications (GSM), code division multiple access (CDMA), wireless in local loop (WLL), general packet radio services (GPRS), 1G, 2G, 3G, 4G long term evolution (LTE), 5G, or the like.

The memory 28 may store one or more applications 32. An application 32 is a software program configured to perform a specific function or set of functions. The application 32 may include one or more computer programs, software components, sets of instructions, procedures, functions, objects, classes, instances, related data, or a portion thereof adapted for implementation in a suitable computer readable program code. The applications 32 may be stored within the memory 28 of the on-board controllers 24 in the vehicles 12, or in additional or separate memory, such as within a memory 28 of a cloud computing device such as the cloud computing server 14. Examples of the applications 32 include audio or video streaming services, games, browsers, social media, and an application for detecting camera 16 position changes on movable vehicle 12 components. Hereinafter, for the sake of simplicity and to improve clarity, the application for detecting camera 16 position change on moving vehicle 12 components is referred to as the DCPC 34.

Figure 2:
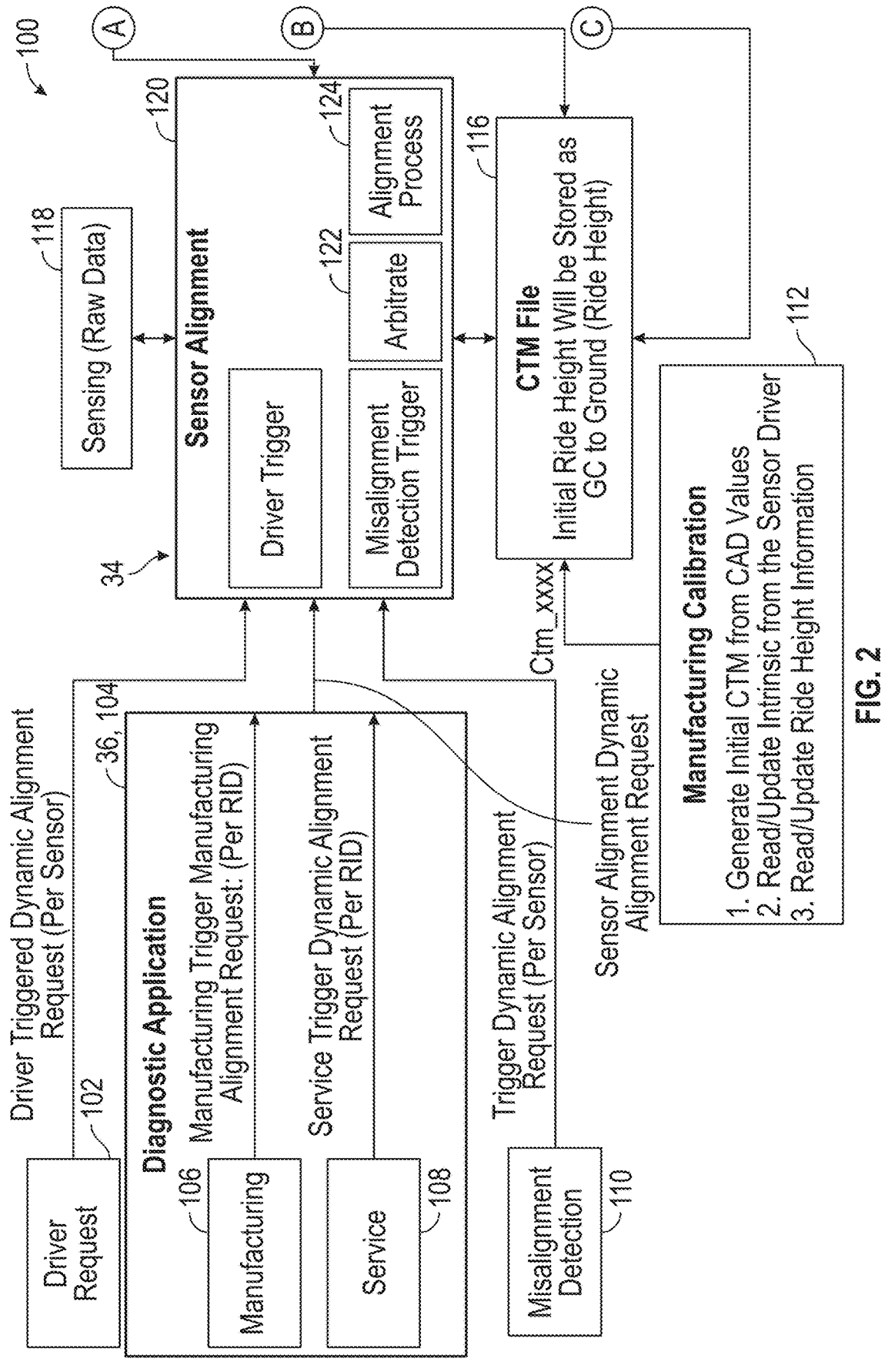
FIG. 2 is a flowchart depicting logical flow of functions of the system for utilizing the DCPC of FIGS. 1A and 1B according to an aspect of the present disclosure.
Figure 2:
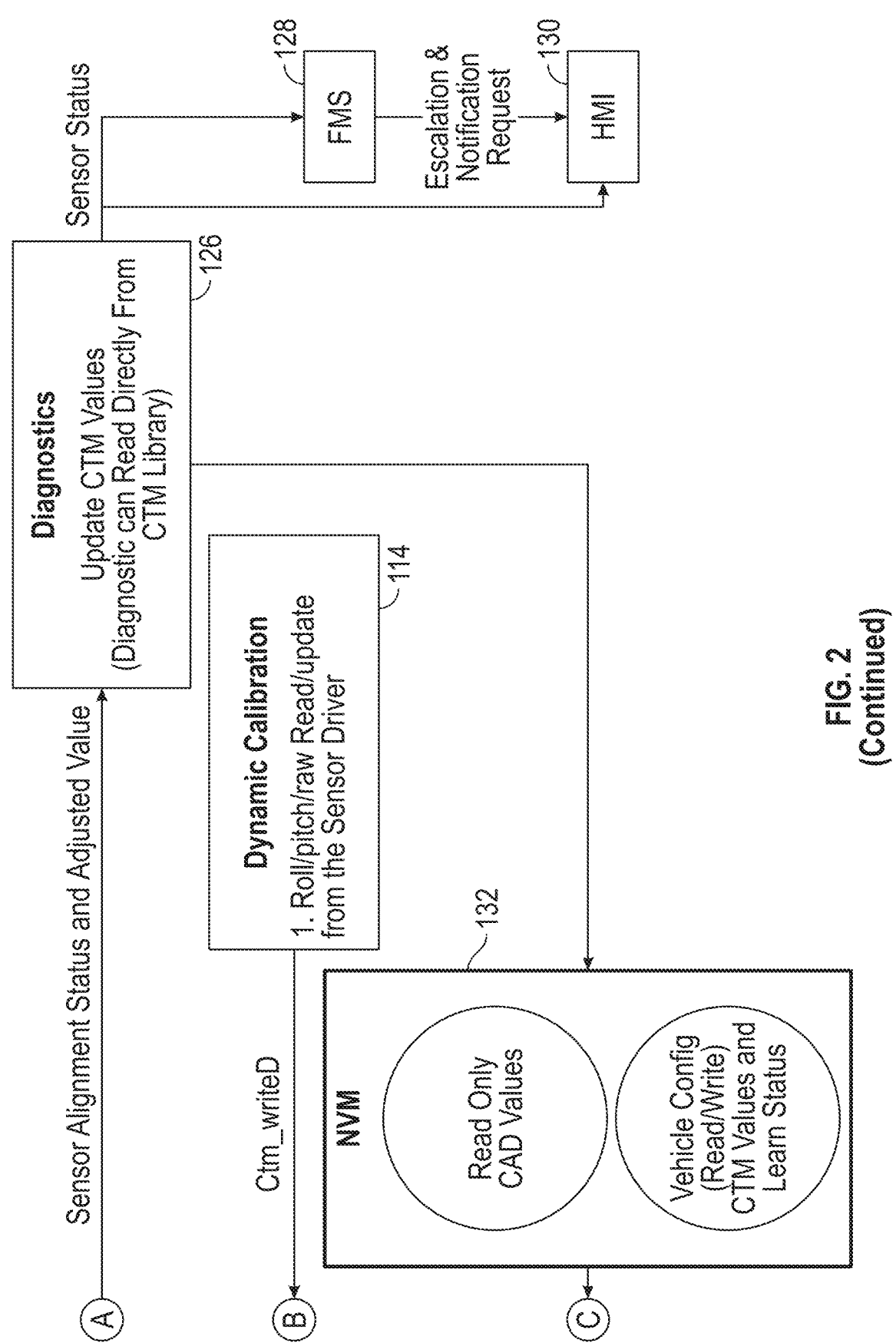

Referring now to FIG. 2 and with continuing reference to FIGS. 1A and 1B, a schematic diagram of a method 100 for utilizing the DCPC 34 functions is shown in flowchart form. As movable vehicle 12 components are moved, the cameras 16 mounted thereto are moved as well, resulting in changes in camera 16 FOV 22. When such movement occurs, cameras 16 used in autonomous driving or advanced driver assistance system (ADAS) functions may report information to the ADAS that is of reduced utility, or which may not provide sufficiently accurate information to enable ADAS functionality relying thereon. Moreover, it should be appreciated that electrical issues, such as blown fuses, short circuits, damaged wiring, inoperable or partially operable switches, movable part motor damage or failures, or mechanical issues such as bent mounting brackets or the like may cause changes in camera 16 FOV 22. Accordingly, the DCPC 34 utilizes the overlapping FOVs 22 of at least two cameras 16 to detect whether a change in camera 16 position has occurred for one or more of the at least two cameras 16.

The DCPC 34 utilizes common features from pixel locations within image data acquired from each of the at least two cameras 16, and within a shared or overlapping FOV 22 of the at least two cameras 16. The DCPC 34 measures a mutual information metric between the cameras 16 to determine a status change based on pre-set thresholds and baseline values. In several aspects, the DCPC 34 may be applied to detect a change in position of cameras 16 or sensors 14 disposed on movable vehicle 12 components. The change in status functions as an enabling condition for sensor 14 alignment applications such as camera-to-vehicle (C2V) and camera-to-lidar (C2L) algorithms. The DCPC 34 functions in a lightweight manner which negates the need for computationally heavy full sensor 14 alignment procedures to run constantly for sensor 14 extrinsic monitoring.

The method 100 begins at block 102 where a vehicle 12 operator request is received. The operator request may be triggered as a dynamic alignment request on a per sensor 14 basis. At block 104, a diagnostic application 36 may be executed during a vehicle 12 manufacturing and/or during vehicle 12 service. The diagnostic application 36, in the manufacturing context at block 106, is triggered via a manufacturing alignment request per sensor 14. As sensors 14 are mounted to the vehicle 12 during manufacturing, the positions of such sensors 14 must be calibrated in order for the sensors 14 to provide expected and appropriate information to onboard vehicle 12 systems. Accordingly, the diagnostic application 36 is triggered in the manufacturing context at block 106 to calibrate the positions of the sensors 14 during vehicle 12 manufacturing.

Likewise, the diagnostic application 36, in the service context at block 108, is triggered via a service trigger alignment request per sensor 14. In several aspects, the service context includes situations in which a vehicle 12 is in for scheduled maintenance, repair, or the like, and the position of a sensor 14 is altered during servicing. Accordingly, the diagnostic application 36 is triggered at block 108 to address such positional changes. At block 110 the system 10 may also automatically detect a sensor 14 misalignment on a per sensor 14 basis.

Memory 28 contains known calibrations, such as a manufacturing calibration at block 112 having a library of calibration values and parameters for initial sensor 14 and camera 16 calibrations based on computer-aided design (CAD) values, and intrinsic data from a sensor 14 driver, and live and stored data regarding ride height information of the vehicle 12 and the like. A dynamic calibration is generated in block 114, including dynamic activity of the vehicle 12 such as roll, pitch, yaw, longitudinal and lateral accelerations, and the like, as obtained by sensors 14 of the vehicle via the sensor 14 driver. The manufacturing calibration from block 112 and the dynamic calibration from block 114 is saved in memory 28 at block 116 as a new calibration CTM file in the library of calibration values.

At block 118, the DCPC 34 obtains raw sensor 14 data from the various sensors 14 and cameras 16 equipped to the vehicle 12. The raw sensor 14 data is sent to the DCPC 34 at block 120 along with the operator request from block 102, the diagnostic application 36 results from either manufacturing or service contexts 106, 108, and the misalignment detection from block 110, and the new calibration CTM file.

Within block 120, the DCPC 34 performs an arbitration process 122 and an alignment process 124 based on the operator request 102, the diagnostic application results 36 from block 104, the misalignment detection from block 110, and the new calibration CTM file from block 116. The arbitration process 122 determines among multiple alignment requests when an alignment process 124 should be launched. The alignment process 124 uses raw sensing data to calculate extrinsic as well as intrinsic parameters of the sensors 14. The results of the arbitration and alignment processes 122, 124 are then forwarded for diagnostics at block 126 as a sensor 14 alignment status and adjustment value. At block 126, the diagnostics process updates the CTM calibration based directly on the library of calibration values stored in memory 28. The diagnostics process 126 generates a sensor 14 status and forwards the same to a force measurement system (FMS) at block 128. When the FMS 128 indicates that the sensor 14 or sensors 14 are sufficiently out of calibration that the DCPC 34 cannot effectively make adjustments to account for the pose changes of the sensors 14, then the system 10 escalates a status of the sensor 14 positions and sends a notification request to a human-machine interface (HMI) of the vehicle 12 at block 130. In some examples, the diagnostics process at block 126 may directly notify the vehicle 12 operator via the HMI at block 130 that the sensors 14 are too far out of calibration for the DCPC 34 to make necessary adjustments. In such examples, the HMI will notify the vehicle 12 operator to take the vehicle 12 in for service, and that the sensors 14 and/or cameras 16 may not be used for certain vehicle 12 functions such as ADAS functions, or the like.

By contrast, when the diagnostics process at block 126 determines that the updated CTM values are within the range of adjustment made possible by the DCPC 34, the method 100 proceeds to block 132 where the system 10 updates a vehicle 12 configuration via read/write data stored in the non-volatile memory (NVM) 28 and a learned status of the sensors 14 of the vehicle 12. The updated vehicle 12 configuration and read-only CAD values from the NVM 28 are forwarded to block 116 along with the manufacturing calibration 112 and dynamic calibration 114 where a new, updated CTM value is generated and subsequently forwarded to the DCPC 34 for sensor 14 alignment.

It should be noted that the manufacturing sensor 14 alignment process does not utilize the DCPC 34 itself. Rather, dynamic sensor 14 alignment is allowed while the vehicle 12 is in use after manufacturing, and/or after service. That is, the DCPC 34 is a lightweight monitoring system that operates while the vehicle 12 is under vehicle 12 operator control.

Figure 3:
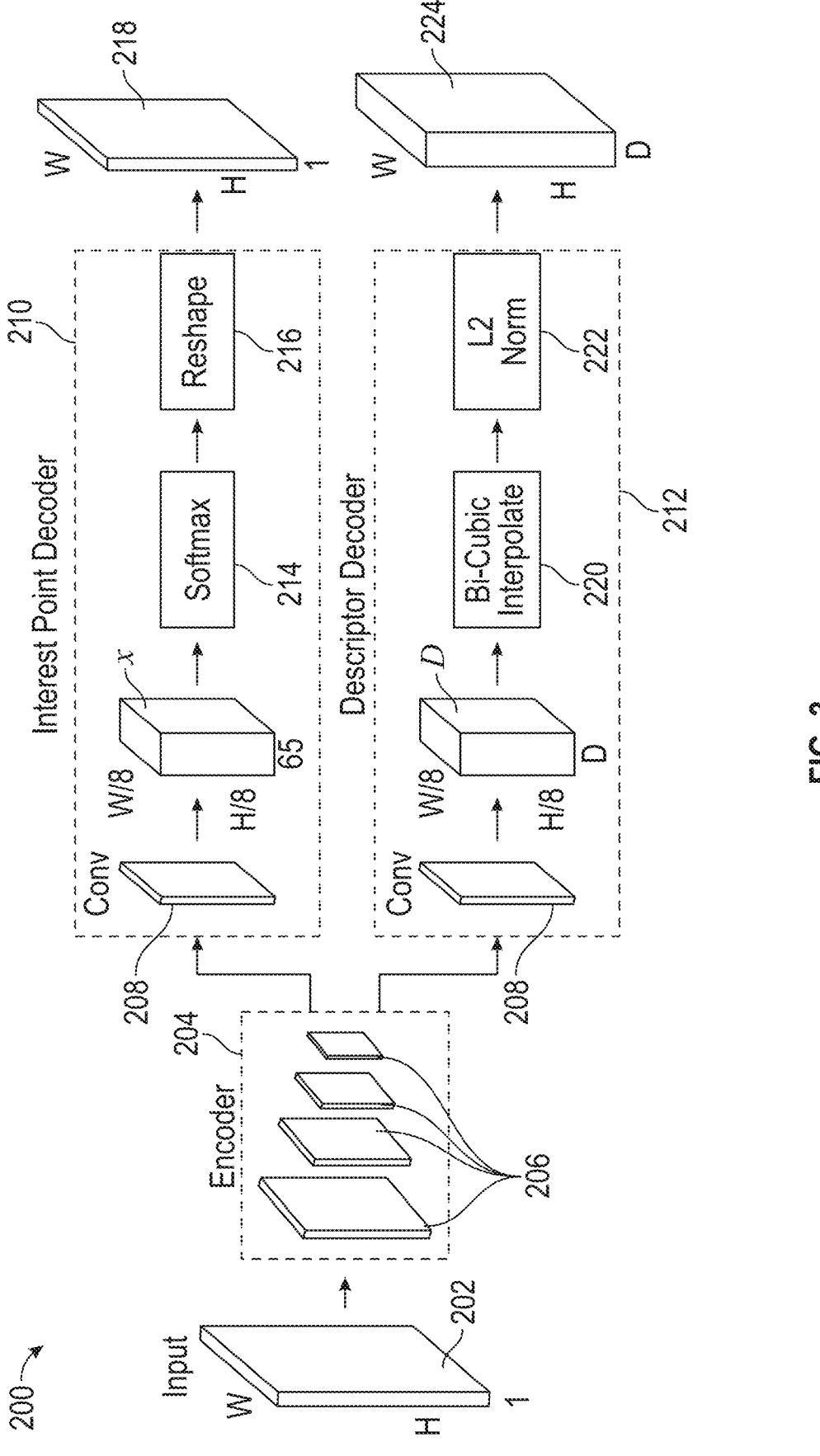
FIG. 3 is a schematic diagram of a portion of the DCPC that performs visual feature extraction utilizing deep learning according to an aspect of the present disclosure.

Turning now to FIG. 3 and with continuing reference to FIGS. 1A, 1B, and 2, the system 10 performs visual feature extraction utilizing deep learning. In several aspects, the precise deep learning methodology may include, but is in no way limited to: deep neural networks (DNNs), convolutional neural networks (CNNs), heterogeneous convolutional neural networks (HCNNs), Long Short Term Memory (LSTM) networks, recurrent neural networks (RNNs), Generative Adversarial Networks (GANs), Radial Basis Function Networks (RBFNs), Multilayer Perceptrons (MLPs), Self-Organizing Maps (SOMs), Deep Belief Networks (DBNs), and/or using learning-based feature points such as self-supervised interest point detection and description (SUPERPOINT), Learned Invariant Feature Transform (LIFT) or hand-crafted feature point techniques such as Scale Invariant Feature Transform (SIFT), Oriented Fast and Rotated Brief (ORB), or the like without departing from the scope or intent of the present disclosure. In the example shown in FIG. 3, the deep learning methodology 200 of the present disclosure acquires input 202 image data from the one or more sensors 14 with width (W) and height (H). The input 202 is passed through a multi-layer encoder 204 which, via convolution and pooling layers 206 reduces the input 202 into a significantly smaller and less computationally complex output 208. The output 208 is forwarded to an interest point decoder 210 and a descriptor decoder 212.

The interest point decoder 210, further decreases a size of the output 208 of the multi-layer encoder 204 by a predetermined factor. In several aspects, the reduction factor may vary in size from application to application, and in accordance with the computational and optical characteristics and capacities of system 10 components. In the example shown in FIG. 3, however, the interest point decoder 210 reduces the output 208 from the multi-layer encoder 204 by a factor of eight (8) to generate an interest point "x". The interest point decoder 210 applies a Softmax activation function 214 to the interest point x data that converts a vector of numbers into a vector of probabilities, where the probabilities of each value are proportional to the relative scale of each value in the vector defining x. The interest point decoder 210 then applies a reshaping function 216 to the output from the Softmax activation function 214, and generates an interest point 218 output.

The descriptor decoder 212 also further decreases a size of the output 208 of the multi-layer encoder 204 by a predetermined factor. In several aspects, the reduction factor may vary in size from application to application, and in accordance with the computational and optical characteristics and capacities of system 10 components. In the example shown in FIG. 3, however, the descriptor decoder 212 reduces the output 208 from the multi-layer encoder 204 by a factor of eight (8) to generate an interest or descriptor "D". The descriptor D is then passed to a Bi-Cubic Interpolator 220 that utilizes a two-dimensional system of using cubic, splines, or other polynomial techniques to sharpen and enlarge an intermediate feature map from output 208. Output from the Bi-Cubic Interpolator 220 is processed via an L2 Norm 222 that normalizes an interest or descriptor "D" with a Euclidean distance 224 of the vector coordinate from the origin of the vector space for the given feature or interest point x.

Figure 4:
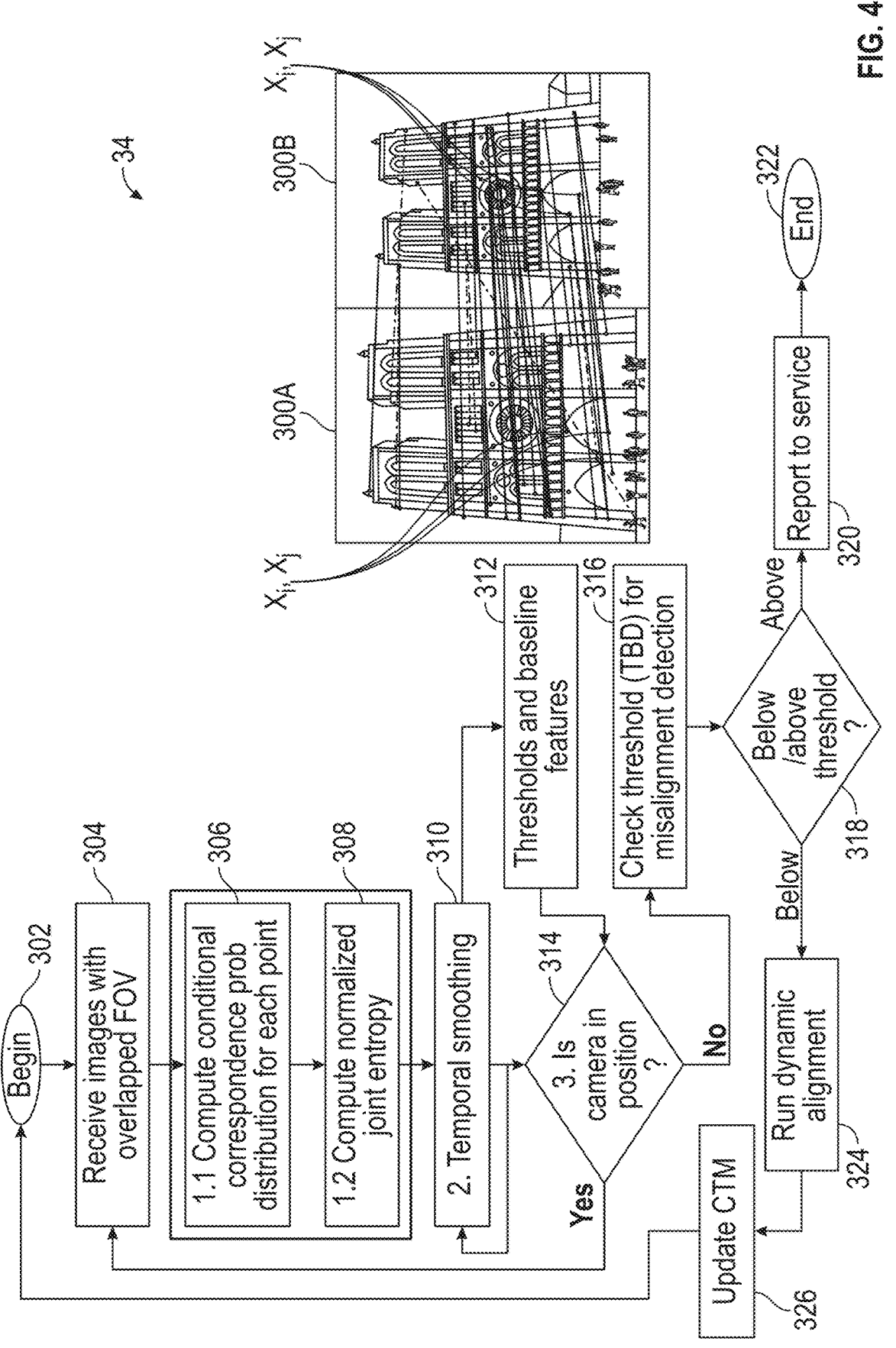
FIG. 4 is a flowchart depicting a method for executing control logic functions of the DCPC on a set of overlapping fields of view of cameras of the system of FIGS. 1A and 1B according to an aspect of the present disclosure.

Turning now to FIG. 4, and with continuing reference to FIGS. 1A, 1B, 2, and 3 the DCPC 34 is shown specifically as a series of method steps in flowchart form, along with image data 300A, 300B retrieved from two cameras 16 having overlapping FOVs 22. The DCPC 34 starts at block 302. At block 304, the DCPC 34 obtains image data from the sensors 14 of the vehicle 12. More specifically, the image data 300A, 300B obtained includes images with overlapping FOVs 22. At block 306, the DCPC 34 computes a conditional correspondence probability distribution for each overlapping feature points $$x'_j, x_i,$$

etc., within the image data 300A, 300B. The conditional correspondence probability distribution may be described as:

$$p\left(x'_j \mid x_i\right) \propto \exp\left(-\frac{d_{ij} - d_N(x_i)}{\lambda d_N(x_i)}\right), \text{ subject to:} \qquad \text{I.}$$

$$\sum_{j=1}^{n'} p\left(x'_j \mid x_i\right) = 1; \qquad \text{II.}$$

where $x'_j$ and $x_i$ are feature points from two comparing images, respectively, $$d_{ij} = dist\big(des(x_i), des(x'_j)\big); \qquad \text{III.}$$

is the pre-defined distance metric between descriptors of the points $x'_j$ and $x_i$, $$d_N(x_i) = \min_j(d_{ij}); \qquad \text{IV.}$$

is, given the pre-defined distance metric, the nearest neighbor of point $x_i$ in feature space, and $\lambda$ is a tunable inverse scale parameter of an exponential probability distribution.

At block 308, the DCPC 34 computes a normalized joint entropy from the conditional correspondence probability distribution for each of the overlapping feature points $x'_j, x_i,$ etc., according to:

$$H(C, C') = -\frac{1}{\eta} \sum_{i=1}^{n} \sum_{j=1}^{n'} p(x_i)p(x'_j \,|\, x_i)\log\big(p(x_i)p(x'_j \,|\, x_i)\big) \qquad \text{V.}$$

where $\eta = \log(nn')$ is the maximum joint entropy, and $p(x_i)$ is a uniform distribution if no prior information is available.

At block 310, the DCPC 34 performs temporal smoothing. As an example, the computed normalized joint entropy can be averaged within a pre-defined time window or a pre-defined number of input frames. Specifically, the DCPC 34 smooths input data to account for vehicle 12 movement that may be unexpected, such as perturbations caused by road disturbances including bumps, potholes, and the like, as well as vehicle 12 directional changes that may or may not be planned. The temporal smoothing at block 310 may run continuously while the DCPC 34 is in operation. Output from the temporal smoothing at block 310 is sent to a compilation of threshold and baseline feature information stored in memory at block 312.

At block 314, the DCPC 34 evaluates features within the image data 300A, 300B for moving part displacement and to determine whether the sensor 14 or camera 16 is in a known and accounted for position. In order to perform the evaluation at block [10] 314, the DCPC 34 obtains the threshold information and baseline feature information from block 312 and stored in memory 28, as well as output from the temporal smoothing at block 310. When, at block 314, the sensor 14 or camera 16 is correctly and accurately located, the DCPC 34 returns back to block 304 where new image data 300A, 300B with one or more overlapping FOVs 22 and one or more overlapping feature points $x'_j, x_i,$ etc., is obtained from the sensors 14.

However, when at block 316, the DCPC 34 determines that sensor 14 or camera 16 is not correctly and accurately located, the DCPC 34 proceeds to block 316. At block 316, the DCPC 34 performs a threshold check for misalignment detection. In several aspects, the threshold check may include a wide range of data and a large quantity of variables, some or all of which may be dependent on the particular hardware, physical location, and FOVs 14 of the system 10. The threshold may be defined as a value of normalized joint entropy calibrated from road testing that tolerates the normal fluctuation of the entropy in normal driving conditions, but still can effectively captures an unexpected displacement of the sensor 14. That is, the threshold check is hardware dependent, but should be understood to define a threshold at or above which, the sensor 14 has been so significantly displaced from an expected position that the DCPC 34 cannot overcome the discrepancy between FOVs 22 to correctly identify a location or position of the one or more sensors 14 relative to one another and relative to the vehicle 12. Accordingly, from the threshold check at block 316 the DCPC 34 proceeds to block 318 where when the DCPC 34 has determined that one or more sensors 14 are at or above threshold, the DCPC 34 escalates a response, generates a notification and/or reports the vehicle 12 for service at block 320. The DCPC 34 may escalate the notification by several different avenues, including, but not limited to: displaying a notification on a vehicle 12 HMI which may be seen, heard, or felt by a vehicle 12 operator, sending a wireless communication to a service center, or other such back-office, setting a code in vehicle 12 memory, or the like. After setting a notification indicating that sensors 14 are at or over threshold, the DCPC 34 proceeds to block 322 where the DCPC 34 ends.

Conversely, the threshold check at block 316 should be appreciated to be a threshold in a range in which the sensor 14 has been significantly displaced from an expected position, but where the DCPC 34 can overcome or correct for the positional change so that the sensor 14 locations and FOVs 22 may be correctly identified relative to one another and relative to the vehicle 12, thereby allowing the vehicle 12 to continue utilizing ADAS features and the like with little or no detriment to performance. Accordingly, when the DCPC 34 determines that the one or more sensors 14 are out of alignment, but below an upper bound of the threshold, the DCPC 34 proceeds to block 324 where a dynamic alignment process is initiated. The dynamic alignment process may include a wide variety of software-based or physical, manual, mechanical, electromechanical, pneumatic, hydraulic processes or combinations thereof that either physically or virtually alter or calibrate a position of the affected sensors 14.

From block 324, the DCPC 34 proceeds to block 326 where the DCPC 34 stores a new calibration CTM file taking into account new alignments of the various affected sensors 14 in the library of calibration values. The new calibration CTM file is then forwarded back to block 302 and used as input to the next iteration of the DCPC 34 application. It should be appreciated that the DCPC 34 may run only upon the occurrence of a vehicle 12 operator request, a service center request, a manufacturer request, or the like, or the DCPC 34 may run iteratively, continuously, and/or recursively while the vehicle 12 is in operation without departing from the scope or intent of the present disclosure.

A system 10 and methods 100, 200, 300 for detecting camera 16 and sensor 14 position change on moving vehicle 12 parts or components of the present disclosure offers several advantages. These include the ability to be applied to detect changes in positions of cameras mounted on a variety of movable vehicle parts in a variety of different vehicle applications, and which may be retrofitted to existing vehicles or equipped to new vehicles. Further, the system 10 and methods 100, 200, 300 can be run continuously without substantially increasing computational burdens, and without increasing system 10 or component complexity, that offer improved robustness, increase redundancy, improve system 10 functionality and resiliency, and improve customer satisfaction.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for detecting sensor position change on movable vehicle components, the system comprising:
   a vehicle having one or more movable vehicle components;
   two or more sensors disposed on at least one of the one or more movable vehicle components, each of the two or more sensors detecting optical information within a distinct field of view (FOV) about an environment surrounding the vehicle, wherein the distinct FOV of each of the two or more sensors at least partially overlaps with an FOV of at least one other sensor;
   one or more controllers, each of the one or more controllers having a processor, a memory, and one or more input/output (I/O) ports, the I/O ports in communication with the two or more sensors; the memory storing programmatic control logic; the processor executing the programmatic control logic; the programmatic control logic including an application for detecting sensor position change (DCPC); the DCPC comprising:
   a first control logic for acquiring overlapping optical information from the two or more sensors;
   a second control logic for computing a conditional correspondence probability distribution for feature points in the overlapping optical information, including:
   computing conditional correspondence distribution for overlapping feature points by:

$$p\left(x_j' \mid x_i\right) \propto \exp\left(-\frac{d_{ij} - d_N(x_i)}{\lambda d_N(x_i)}\right), \text{ subject to:}$$

$$\sum_{j=1}^{n'} p\left(x_j' \mid x_i\right) = 1$$

where $$x_j' \text{ and } x_i$$

are feature points from images acquired from separate sensors, respectively; where $$d_{ij} = dist\left(des(x_i), des\left(x_j'\right)\right)$$

is a predefined distance metric monotonically increasing relative to a Euclidean distance between descriptors of points $$x_j' \text{ and } x_j;$$

where $$d_N(x_i) = \min_j(d_{ij})$$

is a nearest neighbor of point $x_i$ in feature space, given the predefined metric; and
   where $\lambda$ is a tunable inverse scale parameter of an exponential probability distribution;
   a third control logic for computing a normalized joint entropy of the feature points;
   a fourth control logic for determining that a sensor on a movable vehicle component is in a position manageable by the DCPC; and
   a fifth control logic for continuously monitoring positions of each of the two or more sensors, selectively dynamically aligning the sensors, and ensuring that the two or more sensors are calibrated properly for vehicle perception tasks including advanced driver assistance system (ADAS) functions.

2. The system of claim 1, wherein the first control logic further comprises control logic for:
   acquiring optical information from at least one wide-angle satellite (YSAT) camera having a field of view of 170° to 190°; and
   acquiring optical information at least partially overlapping the YSAT field of view from at least one perception satellite (PSAT) camera having a field of view of 20° to 100°, and wherein the movable vehicle components comprise one or more of: one or more exterior vehicle mirrors, one or more doors, a trunk and a tailgate.

3. The system of claim 1, wherein the first control logic further comprises:
   control logic for performing visual feature extraction utilizing one or more of handcrafted and learning-based methods comprising one or more of: Self-sUPERvised interest POINT detection and description (SUPERPOINT), Learned Invariant Feature Transform (LIFT), Scale Invariant Feature Transform (SIFT), and Oriented Fast and Rotated Brief (ORB).

4. The system of claim 1, wherein the third control logic further comprises:
   computing a normalized joint entropy from the conditional correspondence distribution for each of the overlapping feature points $$x_j', x_i,$$

according to:

$$H(C, C') = -\frac{1}{\eta} \sum_{i=1}^{n} \sum_{j=1}^{n'} p(x_i) p(x'_j \mid x_i) \log\left(p(x_i) p(x'_j \mid x_i)\right)$$

where $\eta = \log(nn')$ is the maximum joint entropy, and $p(x_i)$ is a uniform distribution when prior information is unavailable.

5. The system of claim 1, further comprising:

control logic for applying temporal smoothing to outputs of the second and third control logics, wherein the temporal smoothing accounts for unexpected vehicle movements.

6. The system of claim 1, wherein the fourth control logic further comprises:

control logic for executing a threshold check, wherein the threshold check compares a position of FOVs of the two or more sensors against a library of calibration values.

7. The system of claim 6, wherein the fourth control logic comprises control logic that:

upon determining that a position of a sensor is displaced from an expected position by an amount greater than or equal to a threshold value, causes the DCPC to generate a notification to a vehicle operator; and upon determining that the position of the sensor is displaced from the expected position by an amount less than the threshold value, causes the DCPC to dynamically align the sensor.

8. The system of claim 7, wherein upon determining that the position of the sensor is displaced from the expected position by an amount greater than or equal to the threshold value, the DCPC generates outputs comprising: setting a code in memory of the vehicle, sending the code via wired or wireless communication to a service center, and disabling ADAS functions involving the sensor that is out of position by an amount greater than or equal to the threshold value.

9. The system of claim 4, wherein the fifth control logic further comprises:

selectively dynamically aligning the sensors by applying the conditional correspondence probability distribution for each feature point $$x'_j \text{ and } x_i,$$

determining a Euclidean distance $d_{ij}$ between the corresponding feature points $$x'_j \text{ and } x_i,$$

and generating a calibration for the sensors that accounts for positional discrepancies between the corresponding feature points $$x'_j \text{ and } x_i$$

in the FOVs of each of the sensors.

10. A method for detecting sensor position change on movable vehicle components, the method comprising:

detecting optical information, with two or more sensors disposed on one or more movable vehicle components of a vehicle, each of the two or more sensors having a distinct field of view (FOV) of an environment surrounding the vehicle, wherein the distinct FOV of each of the two or more sensors at least partially overlaps with an FOV of at least one other sensor;

executing, by one or more controllers, programmatic control logic including an application for detecting sensor position change (DCPC), wherein each of the one or more controllers has a processor, a memory, and one or more input/output (I/O) ports, the I/O ports are in communication with the two or more sensors; the memory stores the programmatic control logic; the processor executes the programmatic control logic, wherein executing the DCPC includes:

acquiring overlapping optical information from the two or more sensors;

computing a conditional correspondence probability distribution for feature points in the overlapping optical information, including:

computing conditional correspondence distribution for overlapping feature points by:

$$p(x'_j \mid x_i) \propto \exp\left(-\frac{d_{ij} - d_N(x_i)}{\lambda d_N(x_i)}\right), \text{ subject to:}$$

$$\sum_{j=1}^{n'} p(x'_j \mid x_i) = 1$$

where $$x'_j \text{ and } x_i$$

are feature points from images acquired from separate sensors, respectively; where $$d_{ij} = dist\left(des(x_i), des(x'_j)\right)$$

is a predefined distance metric monotonically increasing relative to a Euclidean distance between descriptors of the points $$x'_j \text{ and } x_i;$$

where $$d_N(x_i) = \min_j(d_{ij})$$

is the nearest neighbor of point $x_i$ in feature space, given a predefined metric; and where $\lambda$ is a tunable inverse scale parameter of an exponential probability distribution;

computing a normalized joint entropy of the feature points;

determining that a sensor on a movable vehicle component is in a position manageable by the DCPC; and continuously monitoring positions of each of the two or more sensors, selectively dynamically aligning the sensors, and ensuring that the two or more sensors are calibrated properly for vehicle perception tasks including advanced driver assistance system (ADAS) functions.

11. The method of claim 10, further comprising:

acquiring optical information from at least one wide-angle satellite (YSAT) camera having a field of view of 170° to 190°; and acquiring optical information at least partially overlapping the YSAT field of view from at least one perception satellite (PSAT) camera having a field of view of 20° to 100°, and wherein the movable vehicle components.

12. The method of claim 10, further comprising:

performing visual feature extraction utilizing one or more of handcrafted and learning-based methods comprising one or more of: Self-sUPERvised interest POINT detection and description (SUPERPOINT), Learned Invariant Feature Transform (LIFT), Scale Invariant Feature Transform (SIFT), and Oriented Fast and Rotated Brief (ORB).

13. The method of claim 10, further comprising:

computing a normalized joint entropy from the conditional correspondence distribution for each of the overlapping feature points $$x'_j, x_i,$$

according to:

$$H(C, C') = -\frac{1}{\eta} \sum_{i=1}^{n} \sum_{j=1}^{n'} p(x_i) p(x'_j \mid x_i) \log(p(x_i) p(x'_j \mid x_i))$$

where $\eta = \log(nn')$ is the maximum joint entropy, and $p(x_i)$ is a uniform distribution when prior information is unavailable; and selectively dynamically aligning the sensors by applying the conditional correspondence probability distribution for each feature point $$x'_j \text{ and } x_i,$$

determining a Euclidean distance $d_{ij}$ between the corresponding feature points $$x'_j \text{ and } x_i,$$

and initiating a calibration for the sensors that accounts for positional discrepancies between corresponding feature points $$x'_j \text{ and } x_i$$

in the FOVs of each of the sensors.

14. The method of claim 10, further comprising:

applying temporal smoothing to outputs of normalized entropy and conditional correspondence distribution computations, wherein the temporal smoothing accounts for unexpected vehicle movements.

15. The method of claim 10, further comprising:

executing a threshold check, wherein the threshold check compares a position of FOVs of the two or more sensors against a library of calibration values.

16. The method of claim 15, further comprising:

upon determining that a position of a sensor is displaced from an expected position by an amount greater than or equal to a threshold value, causing the DCPC to generate a notification to a vehicle operator; and upon determining that the position of the sensor is displaced from the expected position by an amount less than the threshold value, causing the DCPC to dynamically align the sensor.

17. The method of claim 16, further comprising:

upon determining that the position of the sensor is displaced from the expected position by an amount greater than or equal to the threshold value, causing the DCPC to generate outputs comprising: setting a code in memory of the vehicle, sending the code via wired or wireless communication to a service center, and disabling ADAS functions involving the sensor that is out of position by an amount greater than or equal to the threshold value.

18. A method for detecting sensor position change on movable vehicle components, the method comprising:

detecting optical information, with two or more sensors disposed on one or more movable vehicle components of a vehicle, each of the two or more sensors having a distinct field of view (FOV) of an environment surrounding the vehicle, wherein the distinct FOV of each of the two or more sensors at least partially overlaps with an FOV of at least one other sensor;

executing, by one or more controllers, programmatic control logic including an application for detecting sensor position change (DCPC), wherein each of the one or more controllers has a processor, a memory, and one or more input/output (I/O) ports, the I/O ports are in communication with the two or more sensors; the memory stores the programmatic control logic; the processor executes the programmatic control logic, wherein executing the DCPC includes:

acquiring overlapping optical information from the two or more sensors, including:

acquiring optical information from at least one wide-angle satellite (YSAT) camera having a field of view of 170° to 190°; and acquiring optical information at least partially overlapping the YSAT field of view from at least one perception satellite (PSAT) camera having a field of view of 20° to 100°, performing visual feature extraction utilizing one or more of handcrafted and learning-based methods comprising one or more of: Self-sUPERvised interest POINT detection and description (SUPERPOINT), Learned Invariant Feature Transform (LIFT), Scale Invariant Feature Transform (SIFT), and Oriented Fast and Rotated Brief (ORB);

computing conditional correspondence distribution for overlapping feature points in the overlapping optical information by:

$$p(x'_j \mid x_i) \propto \exp\left(-\frac{d_{ij} - d_N(x_i)}{\lambda d_N(x_i)}\right), \text{ subject to:}$$

$$\sum_{j=1}^{n'} p(x'_j \mid x_i) = 1$$

where $$x'_j \text{ and } x_i$$

are feature points from images acquired from separate sensors, respectively; where $$d_{ij} = dist\big(des(x_i), des(x'_j)\big)$$

is a predefined distance metric monotonically increasing relative to a Euclidean distance between descriptors of the points $$x'_j \text{ and } x_i,$$

$$d_N(x_i) = \min_j(d_{ij})$$

is the nearest neighbor of point $x_i$ in feature space, given a predefined metric; and where $\lambda$ is a tunable inverse scale parameter of an exponential probability distribution;

computing a normalized joint entropy from the conditional correspondence distribution for each of the overlapping feature points $$x'_j, x_i$$

according to:

$$H(C, C') = -\frac{1}{\eta}\sum\nolimits_{i=1}^{n}\sum\nolimits_{j=1}^{n'} p(x_i)p(x'_j \mid x_i)\log\big(p(x_i)p(x'_j \mid x_i)\big)$$

where $\eta = \log(nn')$ is the maximum joint entropy, and $p(x_i)$ is a uniform distribution when prior information is unavailable; and selectively dynamically aligning the sensors by applying the conditional correspondence probability distribution for each feature point $$x'_j \text{ and } x_i,$$

determining a Euclidean distance $d_{ij}$ between the corresponding feature point $$x'_j \text{ and } x_i,$$

and initiating a calibration for the sensors that accounts for positional discrepancies between corresponding feature points $$x'_j \text{ and } x_i$$

in the FOVs of each of the sensors;

applying temporal smoothing to outputs of normalized entropy and conditional correspondence distribution computations, wherein the temporal smoothing accounts for unexpected vehicle movements;

determining that a sensor on a movable vehicle component is in a position manageable by the DCPC by:

executing a threshold check, wherein the threshold check compares a position of FOVs of the two or more sensors against a library of calibration values, wherein upon determining that the position of a sensor is displaced from an expected position by an amount less than a threshold value, causing the DCPD to selectively dynamically align the sensor by applying the conditional correspondence probability distribution for each feature point $$x'_j \text{ and } x_i,$$

determining a Euclidean distance $d_{ij}$ between the corresponding feature points $$x'_j \text{ and } x_i,$$

and generating a calibration for the sensors that accounts for positional discrepancies between corresponding feature points $$x'_j \text{ and } x_i$$

in the FOVs of each of the sensors; and wherein upon determining that a position of a sensor is displaced from the expected position by an amount greater than or equal to a threshold value, causing the DCPC to generate a notification by performing one or more of: setting a code in memory of the vehicle, sending the code via wired or wireless communication to a service center, notifying a vehicle operator via a human-machine interface (HMI), and at least temporarily disabling ADAS functions involving the sensor that is out of position by an amount greater than or equal to the threshold value; and continuously monitoring positions of each of the two or more sensors, and ensuring that the two or more sensors are calibrated properly for vehicle perception tasks including advanced driver assistance system (ADAS) functions.

* * * * *